US012361837B2

(12) United States Patent
Kearney-Fischer et al.

(10) Patent No.: US 12,361,837 B2
(45) Date of Patent: Jul. 15, 2025

(54) COLLISION AVOIDANCE SYSTEM AND METHOD

(71) Applicant: The Boeing Company, Chicago, IL (US)

(72) Inventors: Martin Kearney-Fischer, Boston, MA (US); Robert A. Vivona, Arlington, MA (US)

(73) Assignee: The Boeing Company, Arlington, VA (US)

( * ) Notice: Subject to any disclaimer, the term of this patent is extended or adjusted under 35 U.S.C. 154(b) by 313 days.

(21) Appl. No.: 17/962,845

(22) Filed: Oct. 10, 2022

(65) Prior Publication Data

US 2024/0119849 A1 Apr. 11, 2024

(51) Int. Cl.
*G08G 5/80* (2025.01)
*G08G 5/34* (2025.01)
(Continued)

(52) U.S. Cl.
CPC ................. *G08G 5/80* (2025.01); *G08G 5/34* (2025.01); *G08G 5/55* (2025.01); *G08G 5/57* (2025.01);
(Continued)

(58) Field of Classification Search
CPC ...... G08G 5/045; G08G 5/0039; G08G 5/006; G08G 5/0069; G08G 5/0086; G08G 5/0091; G08G 5/0021; G08G 5/0052
See application file for complete search history.

(56) References Cited

U.S. PATENT DOCUMENTS

2003/0025614 A1* 2/2003 Kahn .................. G08G 5/0078 340/961
2004/0024527 A1* 2/2004 Patera .................... G08G 5/045 342/29

(Continued)

FOREIGN PATENT DOCUMENTS

EP 3767607 A1 * 1/2021 ............ G01C 21/20

OTHER PUBLICATIONS

Nathan Visvanathan Thanigai, Jul. 17, 2019, English Machine Translation_EP 3767607 A1 provided by Patent Translate by EPO and Google (Year: 2019).*

(Continued)

*Primary Examiner* — Ashley L Redhead, Jr.
(74) *Attorney, Agent, or Firm* — Harrity & Harrity, LLP

(57) ABSTRACT

Example implementations are directed to a method and system for collision avoidance for an aircraft traversing a flight path. The method and system described herein provides an architecture to address the full gamut of complexity that arises when dealing with possible conflicts during aircraft flight. The collision avoidance method and system disclosed herein first receives multiple streams of potential conflict information that not only considers direct obstacles on the flight path of the aircraft, but also considers contextual obstacles that are within a perimeter of the flight path. Once the possible objects are considered, a plurality of alternate flight paths are calculated and the alternate flight path with an acceptable miss distance with a possible obstacle (and minimized deviation from the original flight path) is selected and the aircraft traversing the flight path deviates from the original flight path to the alternate flight path to avoid the collision(s).

20 Claims, 12 Drawing Sheets

(51) Int. Cl.

| | |
|---|---|
| ***G08G 5/55*** | (2025.01) |
| ***G08G 5/57*** | (2025.01) |
| ***G08G 5/59*** | (2025.01) |
| ***G08G 5/74*** | (2025.01) |
| ***G08G 5/76*** | (2025.01) |

(52) U.S. Cl.
CPC ................. *G08G 5/59* (2025.01); *G08G 5/74* (2025.01); *G08G 5/76* (2025.01)

(56) References Cited

U.S. PATENT DOCUMENTS

| | | | | |
|---|---|---|---|---|
| 2004/0024528 | A1* | 2/2004 | Patera .................... | G08G 5/045 340/961 |
| 2010/0256909 | A1* | 10/2010 | Duggan ................. | G08G 5/045 701/301 |
| 2020/0074867 | A1* | 3/2020 | Lefez ................... | G08G 5/0052 |
| 2021/0020049 | A1* | 1/2021 | Nathan ................ | G08G 5/0021 |
| 2021/0375147 | A1* | 12/2021 | Thomassey .......... | G08G 5/0069 |
| 2023/0360546 | A1* | 11/2023 | Ambühl ............... | G08G 5/0021 |

OTHER PUBLICATIONS

"Minimum Operational Performance Standards (MOPS) for Detect and Avoid (DAA) Systems", RTCA Paper No. X/PMC-XXX, RTCA, Inc, Washington, D.C., U.S.A., Sep. 4, 2019. 925 pages.

* cited by examiner

COLLISION AVOIDANCE SYSTEM AND METHOD

BACKGROUND

Field of the Disclosure

The present disclosure relates generally to vehicle collision or obstacle avoidance systems. More particularly, the present disclosure relates to collision or obstacle avoidance systems for autonomous and remote controlled aircraft.

Description of Related Art

Collision or obstacle (used herein interchangeably) avoidance between vehicles and other vehicles and/or obstacles is a paramount safety goal for both passenger and non-passenger vehicles alike. The technology of collision/obstacle avoidance is a rapidly evolving field. Both the automotive and aviation industries have enormous incentives to develop technologies that detect obstacles and avoid colliding with them (generally known in the aviation industry as Detect and Avoid, aka DAA)—to improve the safety of transportation. In the area of aviation, there are numerous companies developing component technologies of DAA. Government institutions (NASA, FAA, DoD, EUROCAE) have been funding the development of these technologies as well. In the last few years, standards bodies, such as the Radio Technical Commission for Aeronautics (RTCA), American Society for Testing and Materials (ASTM), International Civil Aviation Organization, and the Joint Authorities for Rulemaking on Unmanned Systems (JARUS), have begun to work to define DAA.

Most of the systems developed and standardized thus far were written and developed for aircraft with pilots onboard the aircraft, not for autonomous or remotely piloted aircraft (e.g., a remotely piloted drone). Furthermore, the systems were designed to avoid collisions with other aircraft, but fail to consider the surrounding environment. The current systems do not address ground obstacles, prohibited airspaces, weather, or dense population centers. Without taking into consideration these additional points of context, currently available systems inadequately provide collision avoidance for autonomous and remotely controlled aircraft.

It would therefore be desirable to have a system and method that takes into account at least some of the issues discussed above, as well as other possible issues.

BRIEF SUMMARY

Example implementations of the present disclosure are directed to a method and system for collision avoidance for an aircraft traversing a flight path. The method and system described herein provides an architecture to address the full gamut of complexity that arises when dealing with possible conflicts during aircraft flight. The collision avoidance method and system disclosed herein first receives multiple streams of potential conflict information that not only considers direct obstacles on the flight path of the aircraft, but also considers contextual obstacles that are within a perimeter of the flight path. Once the possible objects are considered, a plurality of alternate flight paths are calculated and the alternate flight path with the lowest priority of collision with a possible obstacle is selected and the aircraft traversing the flight path deviates from the original flight path to the alternate flight path to avoid the collision(s).

The present disclosure thus includes, without limitation, the following example implementations.

Some example implementations of the present disclosure provide a collision avoidance method for an aircraft traversing a flight path, the method using one or more processors in communication with a memory having executable instructions stored therein, the method comprising: receiving obstacle tracking data for one or more potential obstacles for the aircraft along or proximate to the flight path, the obstacle tracking data further including data related to one or more contextual obstacles proximate to the flight path; determining, based on the obstacle tracking data as received, a predicted miss distance between the aircraft and each of the one or more potential obstacles along the flight path; determining a plurality of alternate flight path options, each of the plurality of alternate flight path options including a corresponding alternate flight path that deviates from the flight path; assigning at least two of the alternate flight path options a corresponding safety parameter value, the safety parameter value based on at least the predicted miss distance between the aircraft and at least one of the one or more potential obstacles; selecting an alternate flight path from among the plurality of alternate flight path options, the selected alternate flight path selected based at least on the selected alternate flight path having a lowest safety parameter value, the selected alternate flight path for the aircraft avoiding the one or more potential obstacles and at least one of the one or more contextual obstacles proximate to the flight path; and automatically transmitting the selected alternate flight path to a pilot or guidance system of the aircraft.

In some example implementations of the method of any preceding example implementation, or any combination thereof, the method further comprises automatically maneuvering the aircraft with the guidance system to follow the selected alternate flight path; or maneuvering the aircraft by the pilot to follow the selected alternate flight path.

In some example implementations of the method of any preceding example implementation, or any combination thereof, the safety parameter value is further based on a hierarchical list of safety priorities, wherein assigning at least two of the alternate flight path options a corresponding safety parameter value includes assigning each of the alternate flight path options a lower safety parameter value for the alternate flight path option achieving a greater number of safety priorities, and wherein selecting the alternate flight path from among the plurality of alternate flight path options includes selecting the alternate flight path option that achieves the greatest number of safety priorities.

In some example implementations of the method of any preceding example implementation, or any combination thereof, the method further comprises determining a succession of one or more additional alternate flight paths based on the obstacle tracking data as received or additional obstacle tracking data, including additional contextual obstacle tracking data, that is received after the alternate flight path is determined, and the method further comprises: automatically maneuvering the aircraft with the guidance system to follow the succession of one or more additional alternate flight paths; or maneuvering the aircraft by the pilot to follow the succession of one or more additional alternate flight paths.

In some example implementations of the method of any preceding example implementation, or any combination thereof, the method further comprises determining, based on the obstacle tracking data as received, a predicted miss distance between the aircraft and each of the one or more contextual obstacles proximate to the flight path, wherein the safety parameter value is further based on the predicted miss distance between the aircraft and at least one of the one or more contextual obstacles proximate the flight path, and wherein determining the predicted miss distance comprises determining a trajectory of relative motion between the aircraft and each of the one or more potential obstacles, and a trajectory of the aircraft in relation to the one or more contextual obstacles.

In some example implementations of the method of any preceding example implementation, or any combination thereof, determining the alternate flight path comprises determining the alternate flight path in response to the predicted miss distance between the aircraft and at least one of the one or more potential obstacles being equal to or less than a predetermined threshold; and determining the plurality of alternate flight path options comprises determining the plurality of alternate flight path options in response to the predicted miss distance between the aircraft and at least one of the one or more contextual obstacles being equal to or less than a predetermined threshold.

In some example implementations of the method of any preceding example implementation, or any combination thereof, receiving obstacle tracking data for the one or more contextual obstacles comprises receiving obstacle tracking data associated with ground-based obstacles, air traffic obstacles, or atmospheric-related obstacles, along or proximate to the flight path.

In some example implementations of the method of any preceding example implementation, or any combination thereof, receiving obstacle tracking data associated with ground-based obstacles comprises receiving obstacle tracking data including terrain underlying or proximate to the flight path, objects extending above-ground, population centers underlying the flight path, population density underlying or proximate to the flight path, geographic features underlying or proximate to the flight path, or airspaces along or proximate to the flight path.

In some example implementations of the method of any preceding example implementation, or any combination thereof, receiving obstacle tracking data associated with atmospheric-related obstacles comprises receiving obstacle tracking data including weather or atmospheric conditions along or proximate to the flight path; and receiving obstacle tracking data associated with air traffic obstacles comprises receiving obstacle tracking data including any airborne objects within or predicted to enter the flight path or disposed proximate to the flight path.

In some example implementations of the method of any preceding example implementation, or any combination thereof, receiving the obstacle tracking data comprises receiving the obstacle tracking data from one or more data stores in communication with the aircraft or from one or more sensors associated with or in communication with the aircraft.

Some other example implementations of the present disclosure provide a collision avoidance system for an aircraft traversing a flight path, the collision avoidance system comprising: a processor and a non-transitory computer readable medium comprising executable instructions that when executed by the processor, causes the collision avoidance system to be configured to: receive obstacle tracking data for one or more potential obstacles for the aircraft along or proximate to the flight path, the obstacle tracking data further including data related to one or more contextual obstacles proximate to the flight path; determine, based on the obstacle tracking data as received, a predicted miss distance between the aircraft and each of the one or more potential obstacles along the flight path; determine a plurality of alternate flight path options, each of the plurality of alternate flight path options including a corresponding alternate flight path that deviates from the flight path; assign at least two of the alternate flight path options a corresponding safety parameter value, the safety parameter value based on at least the predicted miss distance between the aircraft and at least one of the one or more potential obstacles; select an alternate flight path from among the plurality of alternate flight path options, the selected alternate flight path selected based at least on the selected alternate flight path having a lowest safety parameter value, the selected alternate flight path for the aircraft avoiding the one or more potential obstacles and at least one of the one or more contextual obstacles proximate to the flight path; and automatically transmit the selected alternate flight path to a pilot or guidance system of the aircraft.

In some example implementations of the collision avoidance system of any preceding example implementation, or any combination thereof, the collision avoidance system is further configured to automatically maneuver the aircraft with the guidance system to follow the selected alternate flight path.

In some example implementations of the collision avoidance system of any preceding example implementation, or any combination thereof, the safety parameter value is further based on a hierarchical list of safety priorities, wherein the collision avoidance system being configured to assign at least two of the alternate flight path options a corresponding safety parameter value includes the collision avoidance system being configured to assign each of the alternate flight path options a lower safety parameter value for the alternate flight path option achieving a greater number of safety priorities, and wherein the collision avoidance system being configured to select the alternate flight path from among the plurality of alternate flight path options includes the collision avoidance system being configured to select the alternate flight path option that achieves the greatest number of safety priorities.

In some example implementations of the collision avoidance system of any preceding example implementation, or any combination thereof, the collision avoidance system is further configured to determine a succession of one or more additional alternate flight paths based on the obstacle tracking data as received or additional obstacle tracking data, including additional contextual obstacle tracking data, that is received after the alternate flight path is determined, and the collision avoidance system is further configured to automatically maneuver the aircraft with the guidance system to follow the succession of one or more additional alternate flight paths.

In some example implementations of the collision avoidance system of any preceding example implementation, or any combination thereof, the collision avoidance system is further configured to determine, based on the obstacle tracking data as received, a predicted miss distance between the aircraft and each of the one or more contextual obstacles proximate to the flight path, wherein the safety parameter value is further based on the predicted miss distance between the aircraft and at least one of the one or more contextual obstacles proximate the flight path, and wherein the collision avoidance system being configured to determine the predicted miss distance comprises the collision avoidance system being configured to determine a trajectory of relative motion between the aircraft and each of the one or more potential obstacles, and a trajectory of the aircraft in relation to the one or more contextual obstacles.

In some example implementations of the collision avoidance system of any preceding example implementation, or any combination thereof, the collision avoidance system being configured to determine the alternate flight path comprises the collision avoidance system being configured to determine the alternate flight path in response to the predicted miss distance between the aircraft and at least one of the one or more potential obstacles being equal to or less than a predetermined threshold; and wherein the collision avoidance system being configured to determine the plurality of alternate flight path options comprises the collision avoidance system being configured to determine the plurality of alternate flight path options in response to the predicted miss distance between the aircraft and at least one of the one or more contextual obstacles being equal to or less than a predetermined threshold.

In some example implementations of the collision avoidance system of any preceding example implementation, or any combination thereof, the collision avoidance system being configured to receive obstacle tracking data for the one or more contextual obstacles comprises the collision avoidance system being configured to receive obstacle tracking data associated with ground-based obstacles, air traffic obstacles, or atmospheric-related obstacles, along or proximate to the flight path.

In some example implementations of the collision avoidance system of any preceding example implementation, or any combination thereof, the collision avoidance system being configured to receive obstacle tracking data associated with ground-based obstacles comprises the collision avoidance system being configured to receive obstacle tracking data including terrain underlying or proximate to the flight path, objects extending above-ground, population centers underlying the flight path, population density underlying or proximate to the flight path, geographic features underlying or proximate to the flight path, or airspaces along or proximate to the flight path.

In some example implementations of the collision avoidance system of any preceding example implementation, or any combination thereof, the collision avoidance system being configured to receive obstacle tracking data associated with atmospheric-related obstacles comprises the collision avoidance system being configured to receive obstacle tracking data including weather or atmospheric conditions along or proximate to the flight path; and the collision avoidance system being configured to receive obstacle tracking data associated with air traffic obstacles comprises the collision avoidance system being configured to receive obstacle tracking data including any airborne objects within or predicted to enter the flight path or disposed proximate to the flight path.

In some example implementations of the collision avoidance system of any preceding example implementation, or any combination thereof, the collision avoidance system being configured to receive the obstacle tracking data comprises the collision avoidance system being configured to receive the obstacle tracking data from one or more data stores in communication with the aircraft or from one or more sensors associated with or in communication with the aircraft.

These and other features, aspects, and advantages of the present disclosure will be apparent from a reading of the following detailed description together with the accompanying drawings, which are briefly described below. The present disclosure includes any combination of two, three, four or more features or elements set forth in this disclosure, regardless of whether such features or elements are expressly combined or otherwise recited in a specific example implementation described herein. This disclosure is intended to be read holistically such that any separable features or elements of the disclosure, in any of its aspects and example implementations, should be viewed as combinable, unless the context of the disclosure clearly dictates otherwise.

It will therefore be appreciated that this Brief Summary is provided merely for purposes of summarizing some example implementations so as to provide a basic understanding of some aspects of the disclosure. Accordingly, it will be appreciated that the above described example implementations are merely examples and should not be construed to narrow the scope or spirit of the disclosure in any way. Other example implementations, aspects and advantages will become apparent from the following detailed description taken in conjunction with the accompanying drawings which illustrate, by way of example, the principles of some described example implementations.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DISCLOSURE

Figure 1:
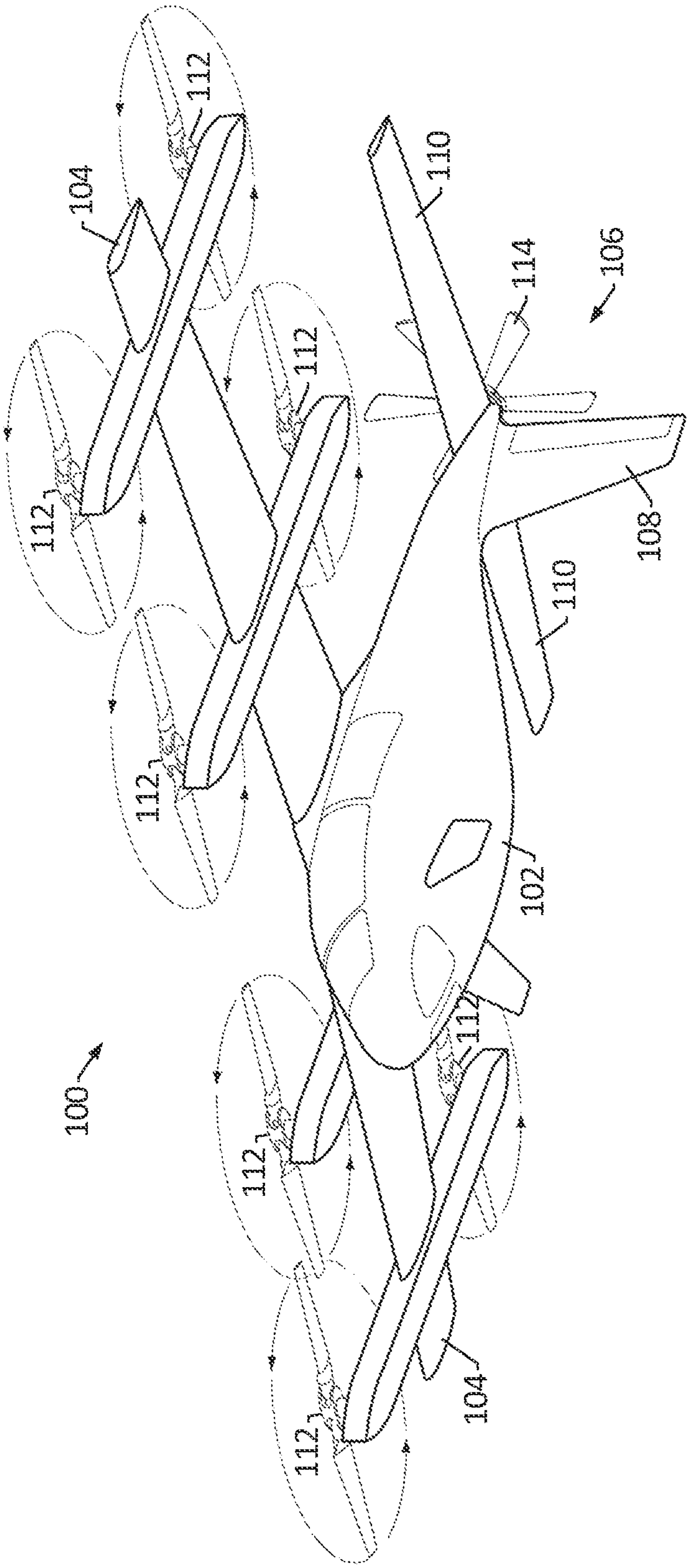
FIG. 1 illustrates an example aircraft, according to some embodiments of the present disclosure.

Some examples of the present disclosure will now be described more fully hereinafter with reference to the accompanying drawings, in which some, but not all aspects of the disclosure are shown. Indeed, various examples of the disclosure are embodied in many different forms and should not be construed as limited to the examples set forth herein; rather, these examples are provided so that this disclosure will be thorough and complete, and will fully convey the scope of the disclosure to those skilled in the art. For example, unless otherwise indicated, reference to something as being a first, second or the like should not be construed to imply a particular order. Also, something described as being above something else (unless otherwise indicated) are instead below, and vice versa; and similarly, something described as being to the left of something else are instead to the right, and vice versa. Like reference numerals refer to like elements throughout.

Example implementations of the present disclosure relate generally to aircraft and robotic aircraft and, in particular, to one or more of the design, construction, operation or use of robotic aircraft. As used herein, a robotic aircraft is a machine designed and configurable to execute maneuvers in its environment. In some example implementations, the robotic aircraft is manned or unmanned. In some example implementations, the robotic aircraft is fully human-controlled, or the robotic aircraft is semi-autonomous or fully-autonomous in which at least some of the maneuvers are executed independent of or with minimal human intervention. In some examples, the robotic aircraft is operable in various modes with various amounts of human control.

The present disclosure is also relevant in the context of non-aerial robotic or autonomous vehicles (e.g., ground, or water vehicles). Examples of suitable robotic aerial and non-aerial vehicles include aerobots, androids, automatons, autonomous vehicles, explosive ordnance disposal robots, hexapods, industrial robots, insect robots, microbots, nanobots, military robots, mobile robots, rovers, service robots, surgical robots, walking robots, and the like. Other examples include a variety of unmanned vehicles, including unmanned ground vehicles (UGVs), unmanned aerial vehicles (UAVs), unmanned surface vehicles (USVs), unmanned underwater vehicles (UUVs), unmanned spacecraft and the like. These include autonomous cars, planes, trains, industrial vehicles, fulfillment center robots, supply-chain robots, robotic vehicles, mine sweepers, and the like.

FIG. 1 illustrates one type of robotic aircraft, namely, a UAV 100, that benefits from example implementations of the present disclosure. As shown, the UAV generally includes a fuselage 102, wings 104 extending from opposing sides of the UAV in a mid-section of the fuselage, and an empennage or tail assembly 106 at a rear end of the fuselage. The tail assembly includes a vertical stabilizer 108 and two horizontal stabilizers 110 extending from opposing sides of the UAV. Rotors 112 and 114 are mounted to, respectively, the wings and the end of the tail assembly for lifting and propelling the UAV during flight. The present disclosure relates to robotic aircraft, but also to pilot-controlled aircraft. Any description herein with respect to the aircraft being autonomous or robotic also relates to describing operations of the method and system herein when the aircraft is pilot-controlled.

Figure 2A:
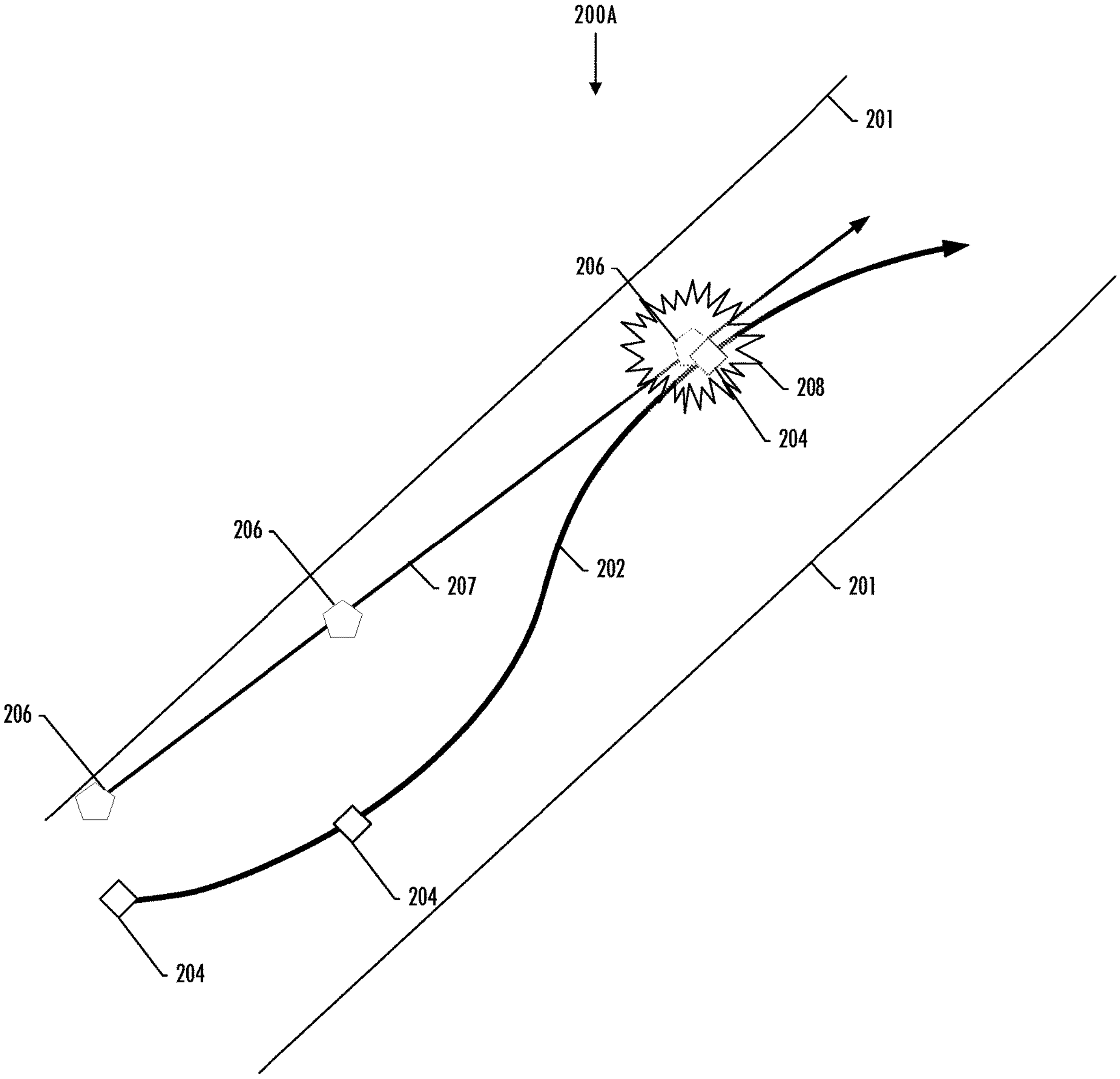
FIGS. 2A-2H illustrate example flight paths, obstacles, and maneuvers of an example aircraft, according to some embodiments of the present disclosure.
Figure 2B:
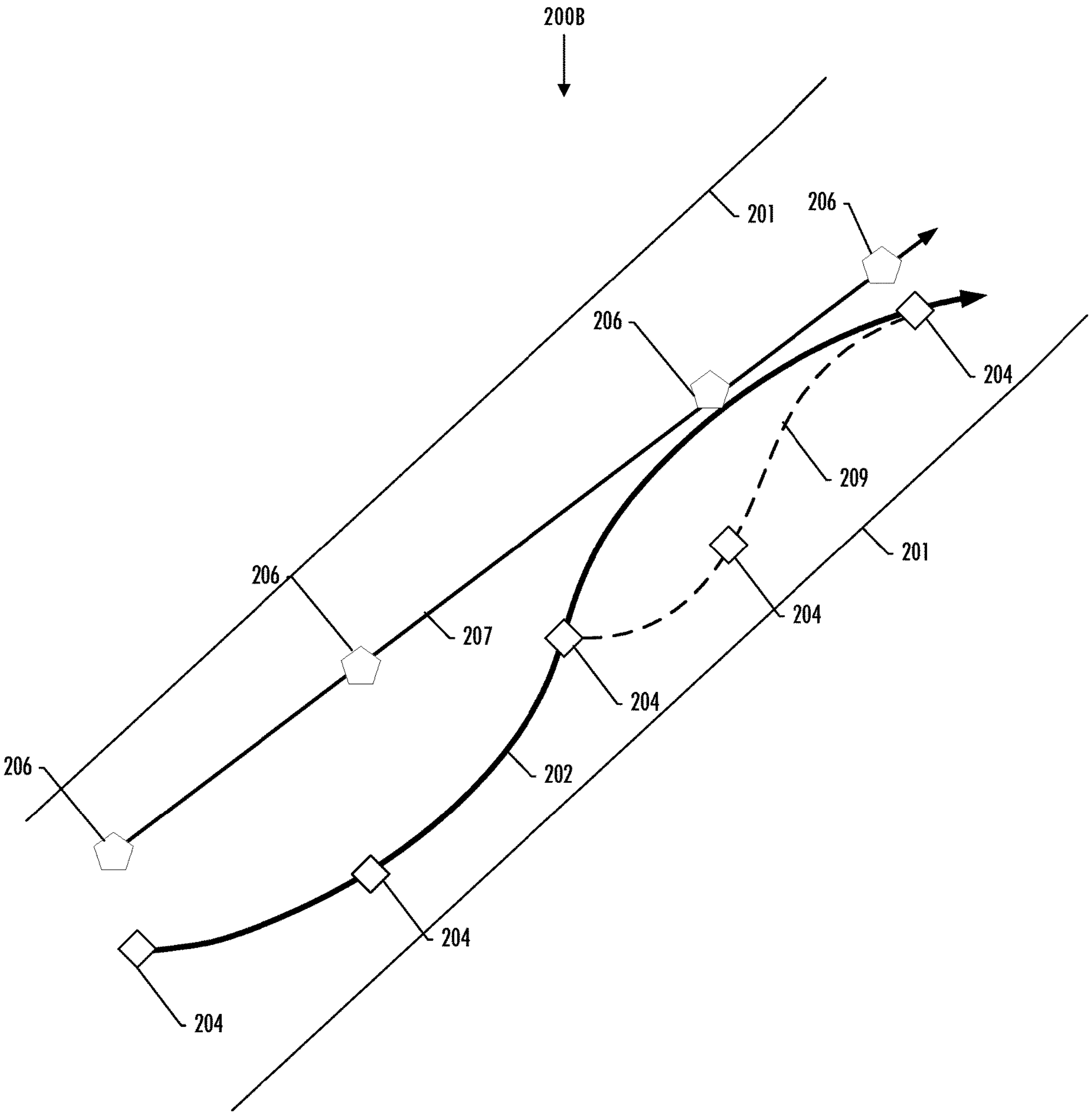

FIGS. 2A-2H illustrate various flight scenarios 200A-200H that help illustrate some implementations of the present disclosure. These flight scenarios illustrate example collisions for which the collision avoidance system is configured to avoid. FIG. 2A illustrates first flight scenario 200A including flight space 201 where one or more objects are flying within the flight space, and there is a possibility of collision between the one or more objects. For example, as illustrated in FIG. 2A, the aircraft 204 is flying along first flight path 202. Multiple instances of the aircraft 204 symbol are shown on the figure to indicate its movement along the first flight path over time. Flying obstacle 206 is also shown flying in the flight space along second flight path 207. Similar to the aircraft, there are multiple instances of the flying obstacle along the second flight path to indicate its movement along the second flight path over time. As shown in the figure, if the flying obstacle and the aircraft continue on their current paths, they will collide with each other at collision point 208. As illustrated in second flight scenario 200B in FIG. 2B, the collision avoidance system described herein is configured to determine alternate flight paths, such as detour 209, along which the aircraft will travel to avoid the potential collision.

To determine the alternate flight paths, the collision avoidance system is configured to receive obstacle tracking data for the flying obstacle 206 and determine, from the obstacle tracking data, a predicted miss distance between the aircraft 204 and the flying obstacle. Methods for receiving the obstacle tracking data are described hereinbelow in the description of FIG. 3A and FIG. 3B. If the predicted miss distance is below a predetermined threshold (e.g., less than an operationally determined safety margin, such as the RTCA DO-365 definition of well clear of 4,000 feet laterally or the FAA definition of a near midair collision of 500 feet laterally, with a prediction confidence of greater than 50%), the collision avoidance system is configured to determine a plurality of alternate flight paths that are calculated to avoid the flying obstacle based on its current trajectory (i.e., alternate flight paths with a predicted miss distance of more than the predetermined threshold). From the plurality of alternate flight paths, the collision avoidance system is configured to select the alternate flight path that is calculated to have the best outcome (the best outcome being one of many potential implementation possibilities—e.g., highest predicted miss distance, miss distance greater than an operational threshold while otherwise minimizing path deviation) with the flying object, or, as described hereinbelow, one or more contextual objects within a perimeter of the current flight path. The collision avoidance system is configured to constantly receive obstacle tracking data to update the flying obstacle's flight path and will generate a new set of alternate flight paths if the predicted miss distance with the flying object is less than the predetermined threshold. The description related to FIGS. 3A and 3B below describes this in further detail.

Figure 2C:
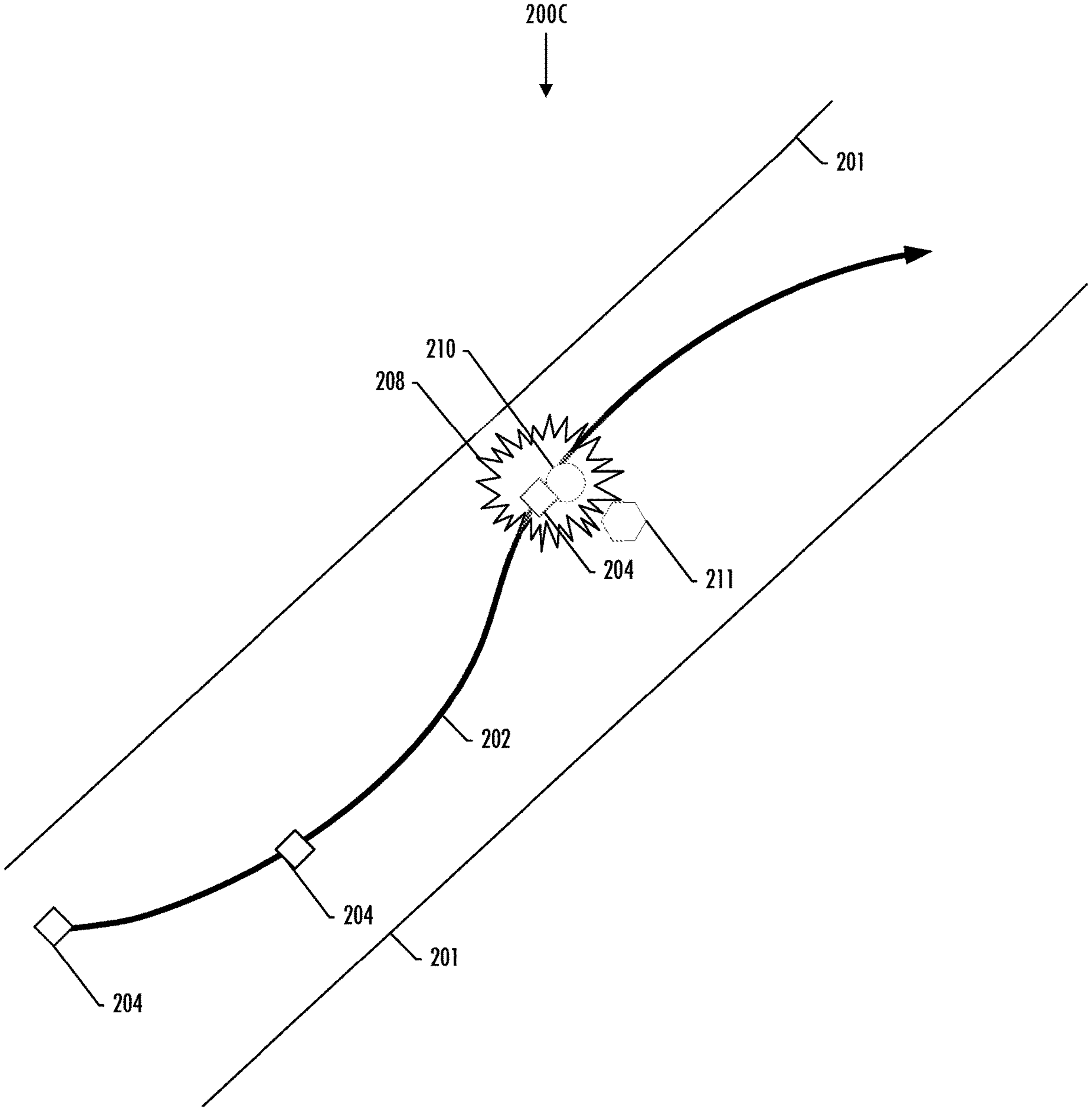

FIG. 2C illustrates third flight scenario 200C, where the aircraft 204 is flying along the first flight path 202. Along the first flight path, is a ground obstacle 210 that the aircraft will collide with at collision point 208 if the aircraft continues along the current first flight path. The ground obstacle includes population density underlying or proximate to the flight path, geographic features underlying or proximate to the flight path, or airspaces along or proximate to the flight path. Similar to the response to the flying object above, the collision avoidance system of the present disclosure is configured to avoid collisions with ground obstacles. In any scenario, when the collision avoidance system is determining alternate flight paths for any potential obstacle (ground, flying, weather, population center, etc.) the collision avoidance system takes into account one or more contextual obstacles 211 as well. That is, the collision avoidance system doesn't want to avoid one potential obstacle just to immediately collide with another obstacle as is maneuvers to the selected alternate flight path. The one or more contextual obstacles include any obstacle that the aircraft is not predicted to collide with along the first flight path, but is within a perimeter of or proximate to the first flight path and could become an obstacle to which the aircraft will collide if the alternate flight path is not calculated to avoid the contextual obstacle.

Figure 2D:
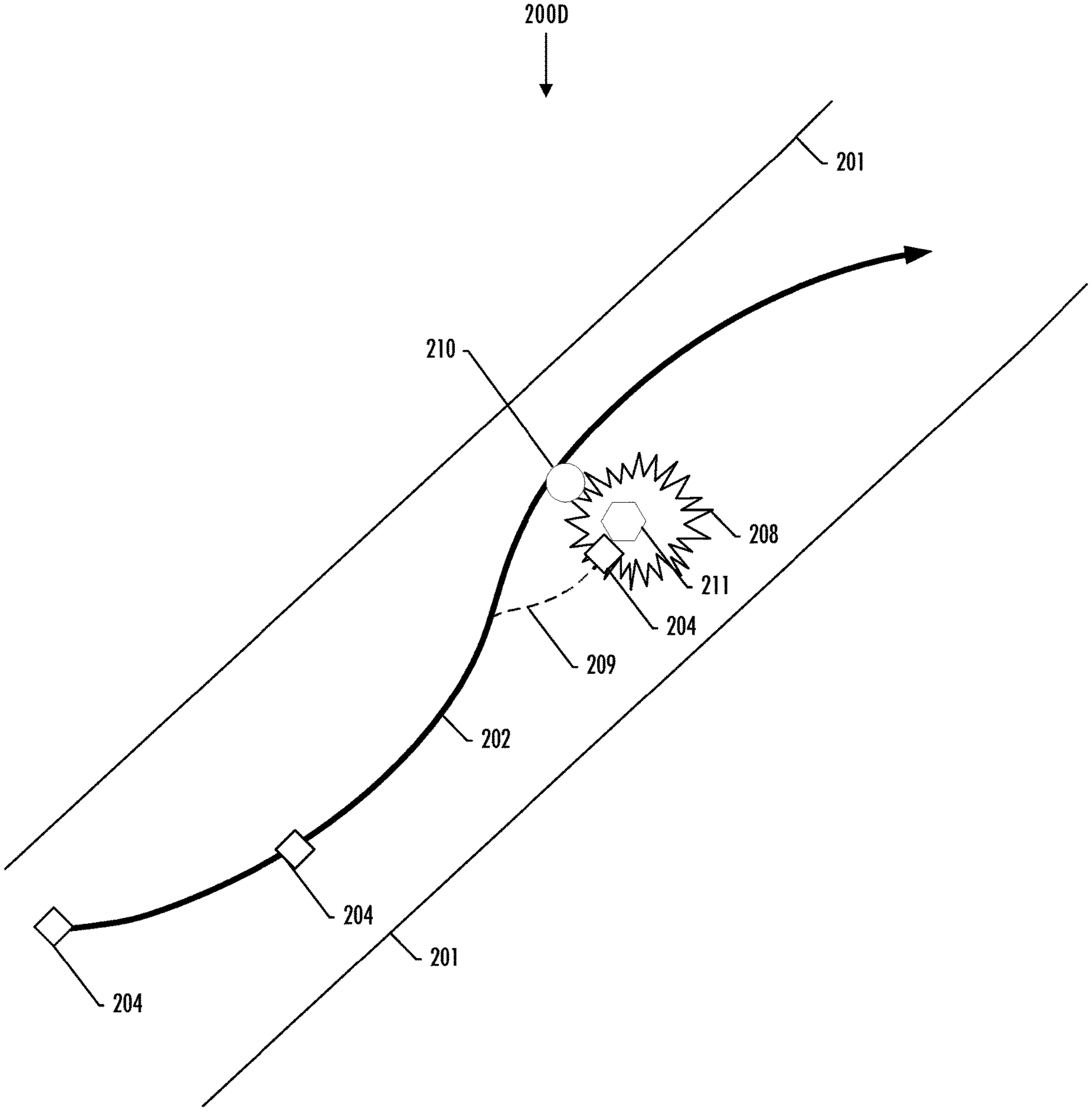

FIG. 2D illustrates fourth flight scenario 200D where an alternate flight path for the third flight scenario 200C in FIG. 2C is depicted. As illustrated in FIG. 2D, if the collision avoidance system calculates an alternate flight path, such as detour 209, the collision avoidance system also will need to take into account the one or more contextual obstacles when determining the alternate flight path. Otherwise, the alternate flight path will avoid the original ground obstacle 210, but then cause the aircraft 204 to collide with the contextual obstacle at collision point 208.

Figure 2E:
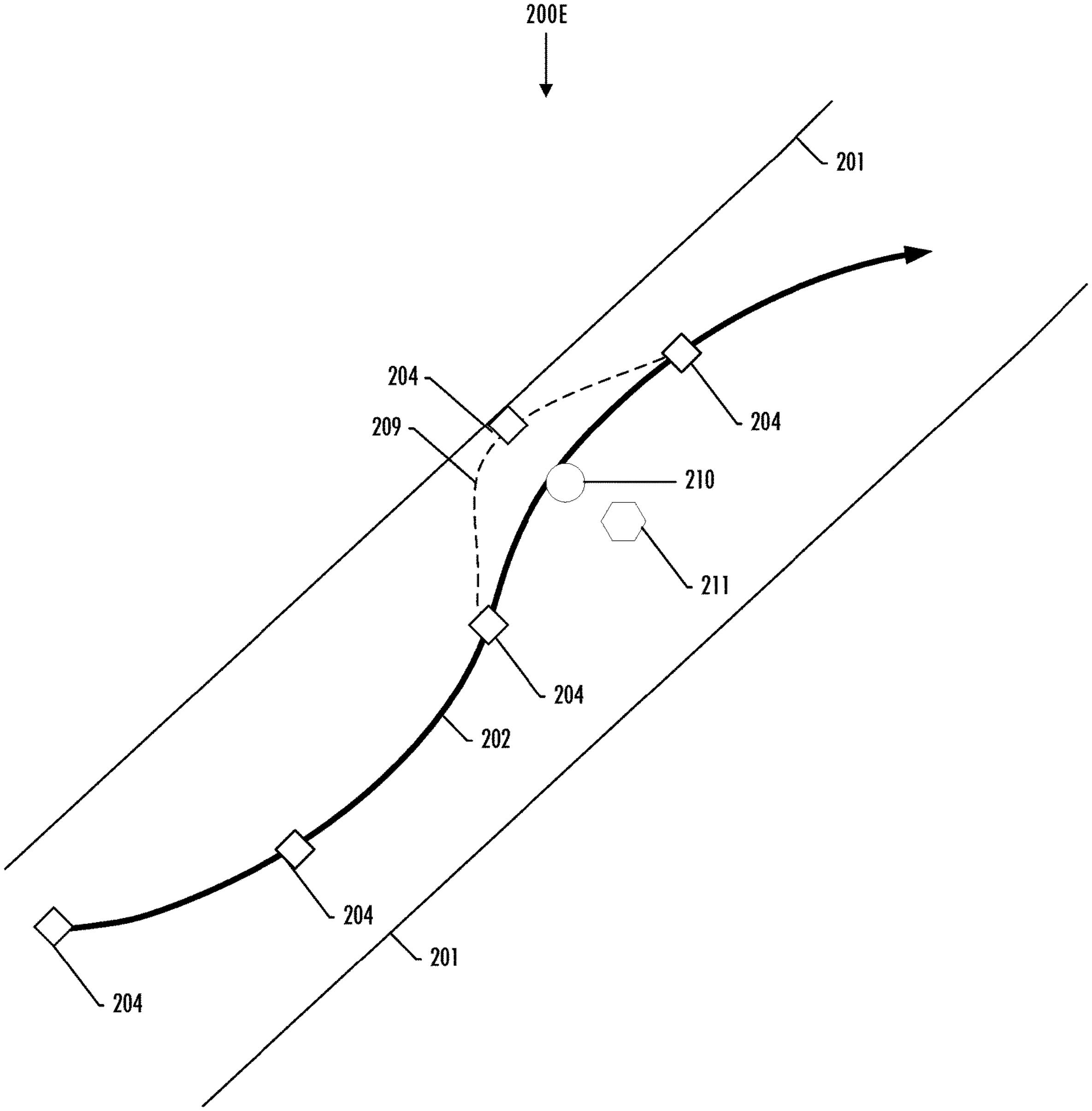

FIG. 2E illustrates fifth flight scenario 200E, where the alternate flight path takes into account both the ground obstacle 210 and the one or more contextual obstacles 211, and the detour 209 is determined to avoid both. To avoid both obstacles, as described above, the collision avoidance system is not only receiving obstacle tracking data regarding the obstacles along the first flight path 202, it is constantly receiving obstacle tracking data for the one or more contextual obstacles as well. The description related to FIGS. 3A and 3B below describes this in further detail. Once a predicted miss distance with the ground obstacle is determined to be below the predetermined threshold (e.g., less than 500 feet with a prediction confidence greater than 50%), the one or more alternate flight paths will be determined and the collision avoidance system will only select as the alternate flight path it will execute an alternate flight path that has a predicted miss distance between the aircraft and the one or more contextual obstacles that is above another predefined threshold (e.g., greater than 1000 feet).

In some example implementations, the thresholds for the predicted miss distances are different for different types of obstacles. For example, an acceptable miss distance for a mountain is different than a drone. Additionally the acceptable miss difference is smaller during takeoff and/or landing. Some other example thresholds for the predicted miss distance includes various standards and regulations, including the following. RTCA DO-365 defines the acceptable miss distance for well clear between two large aircraft in routine flight of 4000 feet laterally or 450 feet vertically. RTCA DO-365 defines the acceptable miss distance for well clear between two large aircraft in during approach/landing/takeoff of 1500 feet laterally or 450 feet vertically. The FAA defines the acceptable miss distance for a near midair collision of 500 feet laterally or 100 feet vertically. ASTM F3442M-20 defines the acceptable miss distance for well clear between a small UAS and a manned aircraft of 2000 feet laterally or 250 feet vertically. 14 CFR 91.119 defines an acceptable miss distance for terrain and fixed wing aircraft over a congested area of 1,000 feet above the highest obstacle within a horizontal radius of 2,000 feet of the aircraft. 14 CFR 91.119 defines an acceptable miss distance for terrain and fixed wing aircraft over a non-congested area of 500 feet above the surface.

Figure 2F:
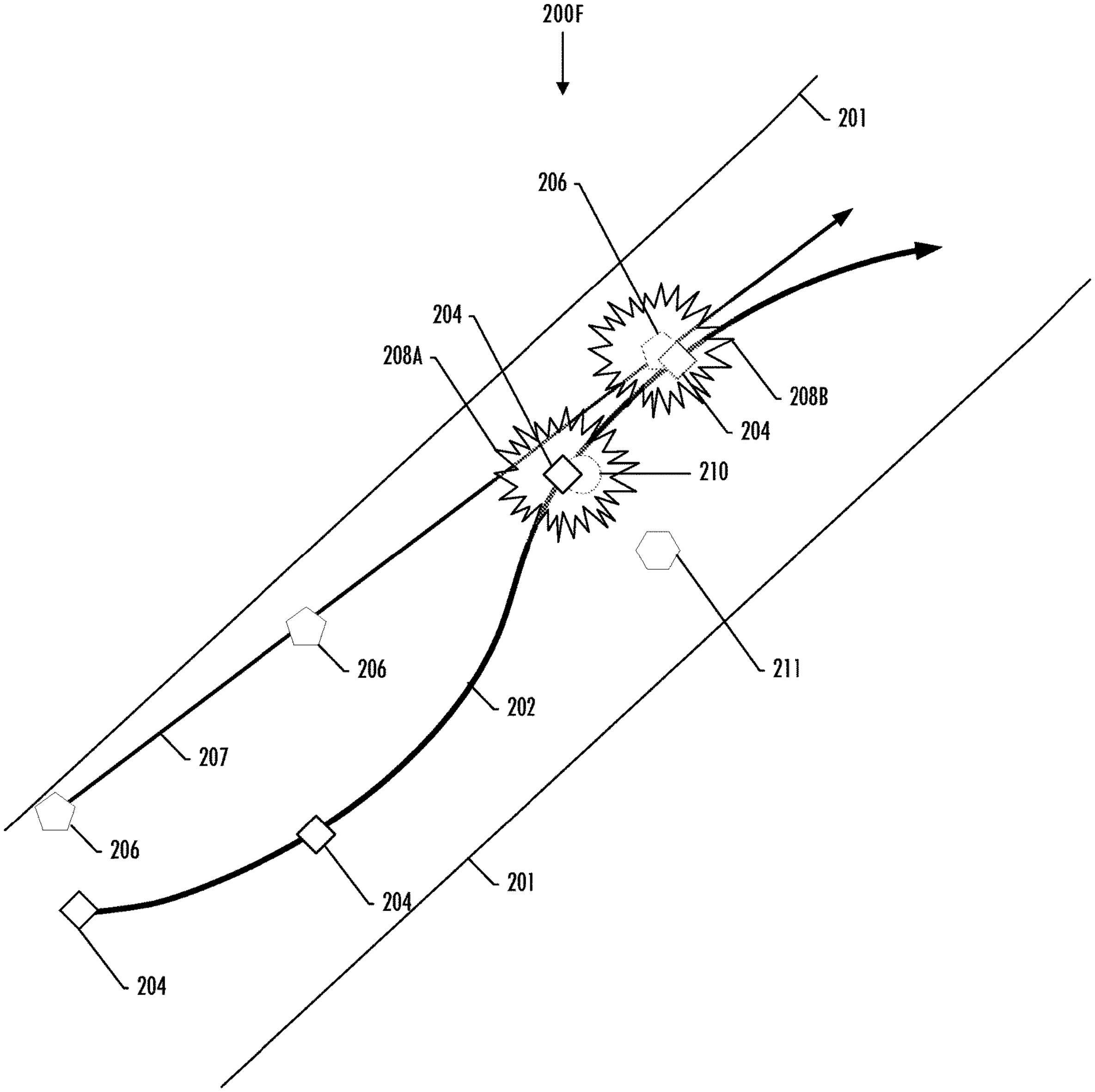
Figure 2G:
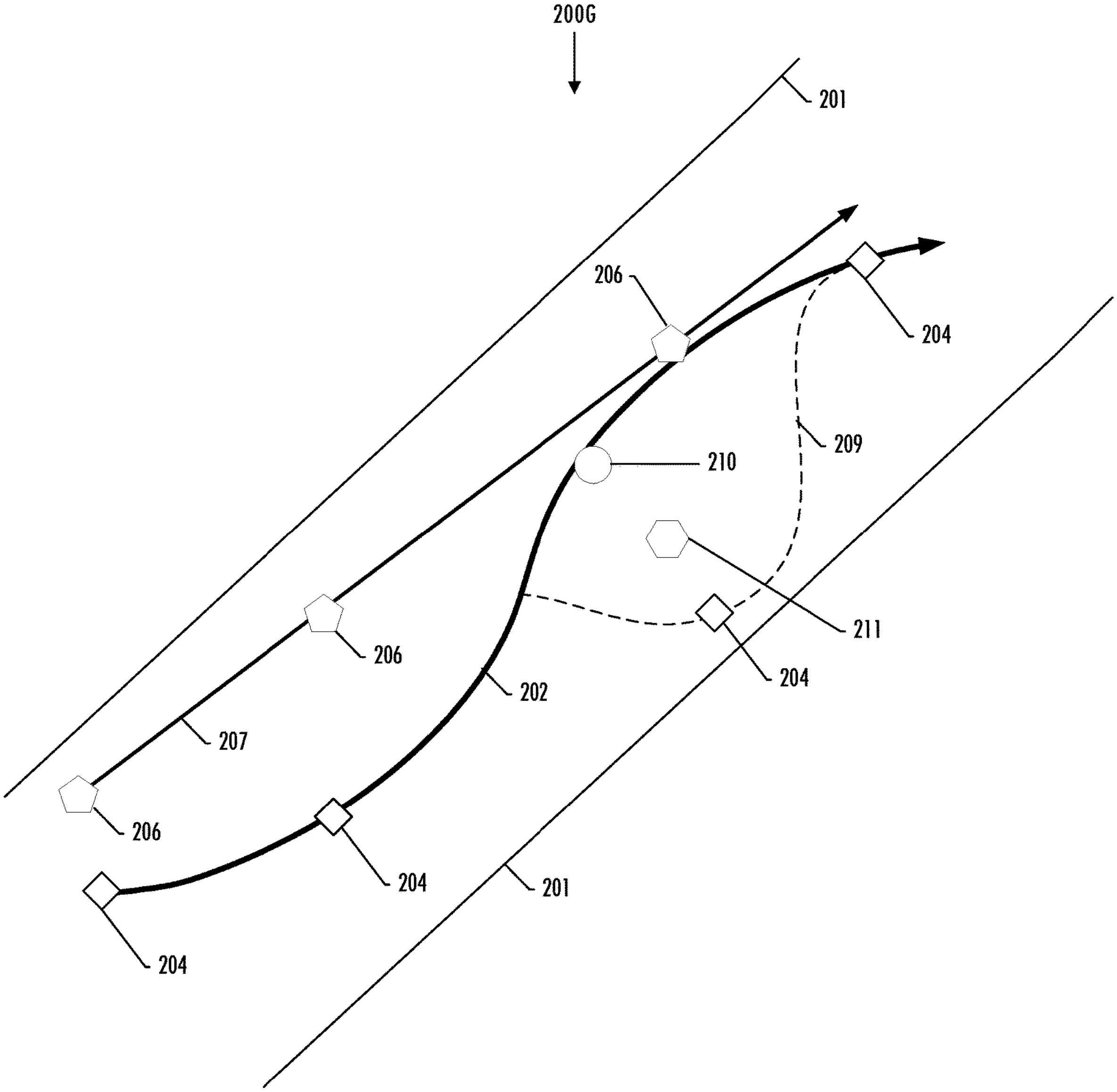

FIG. 2F illustrates sixth flight scenario 200F, where the flying obstacle 206, the ground obstacle 210, and/or one or more contextual obstacles 211 are in the flight space 201 and near the first flight path 202 of the aircraft 204, such that the aircraft is determined to collide with both the ground obstacle and the flying obstacle if the aircraft continues along the first flight path. As shown in the seventh flight scenario 200G of FIG. 2G, in determining the alternate flight path, such as detour 209, the collision avoidance system of the present disclosure will need to take into account all of the obstacles present in the flight space, and calculate the alternate flight path to avoid each obstacle illustrated in the flight space by selecting an alternate flight path that has a probability of colliding with each of the flying obstacle, the ground obstacle, and the one or more contextual obstacles that is less than a predetermined threshold.

Figure 2H:
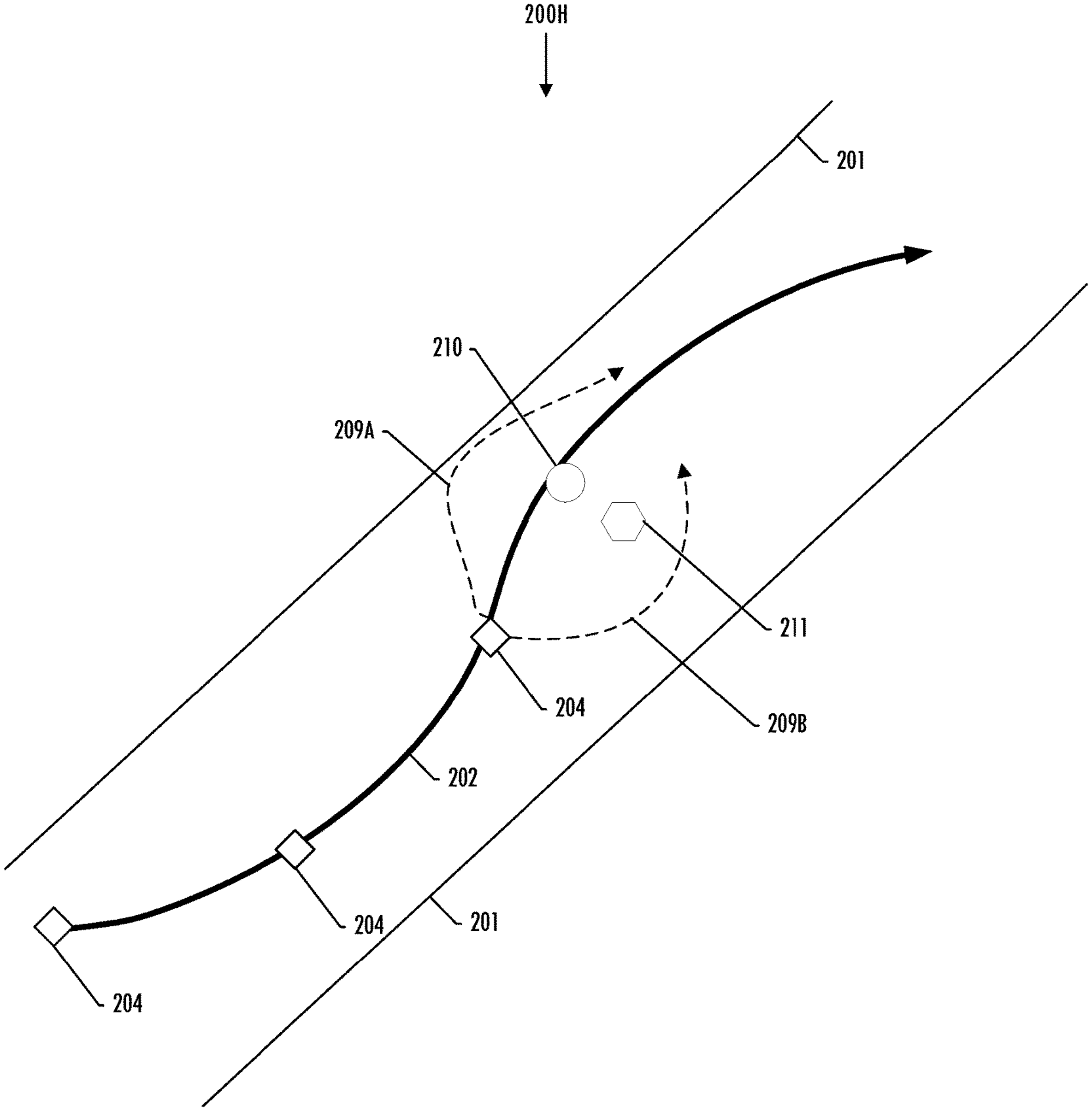

FIG. 2H illustrates eighth flight scenario 200H, where a plurality of alternative flight paths, namely first detour 209A and second detour 209B, are determined. In some embodiments, the collision avoidance system of the present disclosure is configured to determine these plurality of alternative flight paths and select from among the plurality of alternative flight paths, the flight path with the lowest probability of colliding with a potential obstacle or one or more contextual obstacles proximate to the flight path. As described above, and hereinbelow, the collision avoidance system constantly collects obstacle tracking data on these various obstacles, calculates a predicted miss distance with them, and determines the alternate flight paths based on the predicted miss distance of the aircraft with the obstacles being below a predetermined threshold.

Figure 3A:
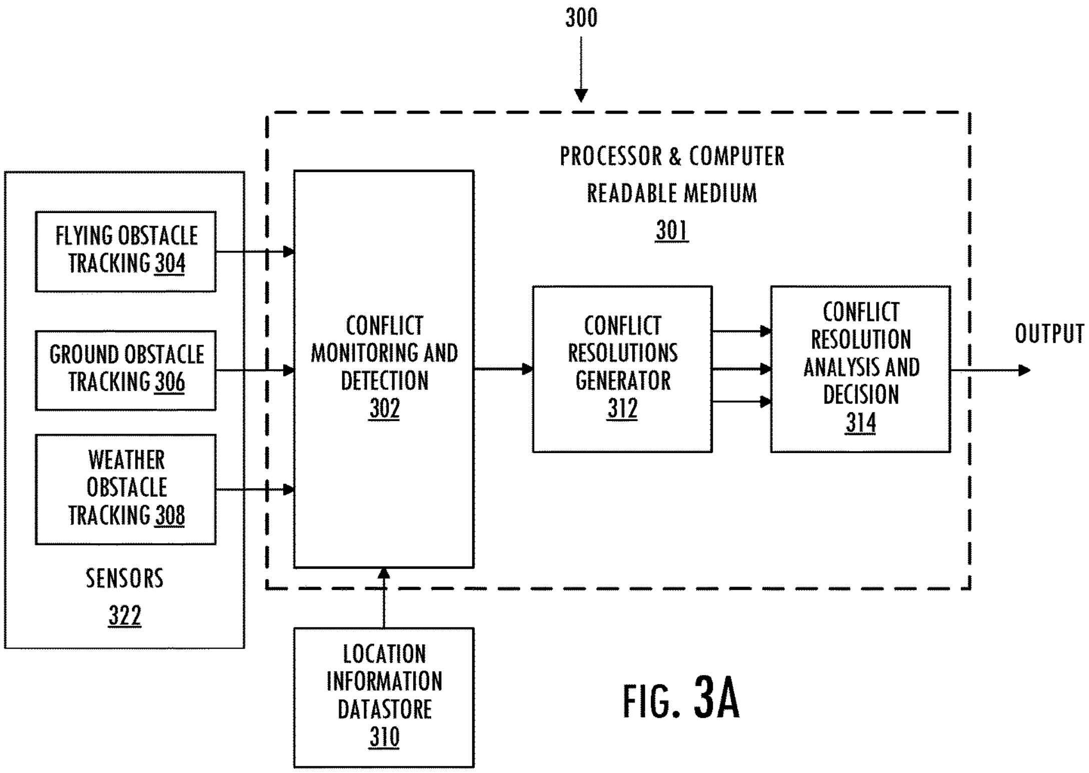
FIG. 3A illustrates an example system block diagram of a collision avoidance system.
Figure 3B:
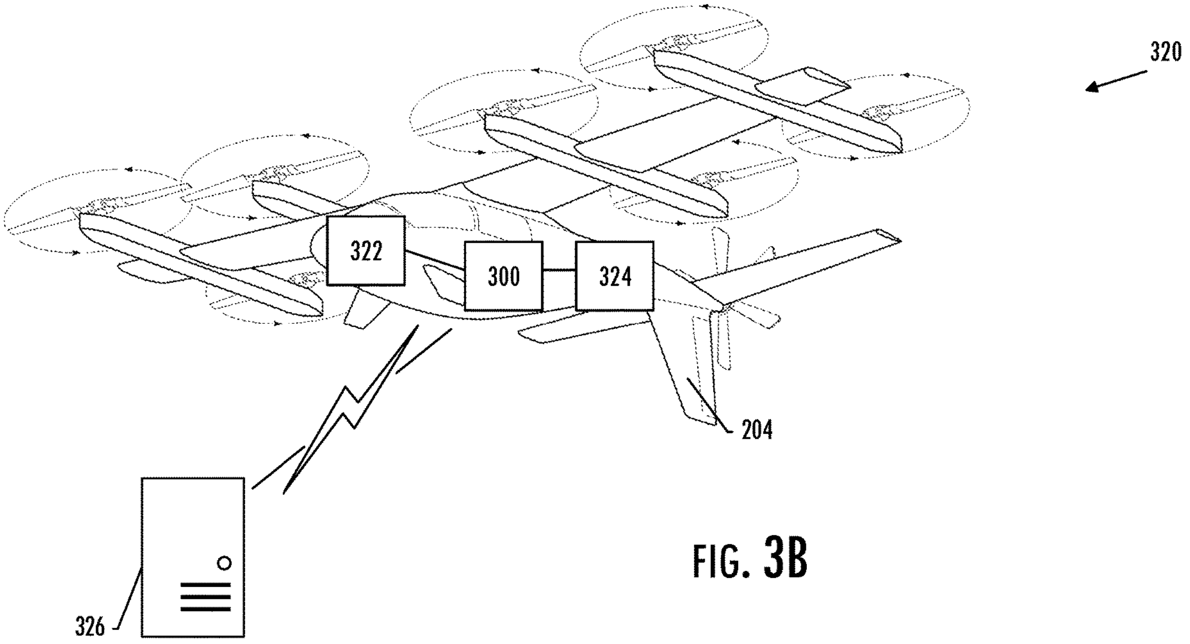
FIG. 3B illustrates the collision avoidance system onboard an example aircraft and various other components, according to some embodiments of the present disclosure.

FIG. 3A illustrates an example system block diagram for a collision avoidance system 300 for an aircraft, such as the aircraft 204, traversing a flight path according to some implementations of the present disclosure. FIG. 3B illustrates an aerial environment 320 wherein the collision avoidance system is located on an aircraft, such as the UAV illustrated in FIG. 1. As depicted in FIG. 3B, aircraft 204 from FIG. 2A-2H is embodied as the UAV illustrated in FIG. 1. The following description makes reference to FIGS. 3A and 3B to describe various functions of the collision avoidance system, and to FIGS. 2A-2H to provide an illustration of flight scenarios for the various functions. For example, the collision avoidance system illustrated in FIG. 3A is implemented on the aircraft 204 illustrated in FIG. 3B. Some of the flight scenarios in FIG. 2A-2H are used hereinbelow to help further describe the operation of the collision avoidance system of the present disclosure. Alternatively, the collision avoidance system is located on any suitable aircraft and not just an autonomous aircraft. Alternatively, the collision avoidance system is located in a ground-based station, such as ground station 326 illustrated in the aerial environment of FIG. 3B, where relevant instructions or control signals are transmitted from the ground-based station to the aircraft for maneuvering along an alternate path.

In some implementations, the collision avoidance system 300 includes a processor and a non-transitory computer readable medium 301 comprising executable instructions. At the conflict monitoring and detection block 302, the collision avoidance system 300 is configured to receive obstacle tracking data for one or more potential obstacles, such as the flying obstacle 206 or ground obstacle 210 from FIG. 2F, for the aircraft 204 along or proximate to the first flight path 202. The obstacle tracking data further includes data related to one or more contextual obstacles proximate to the flight path, such as contextual obstacle 211 shown in FIG. 2F. The collision avoidance system is configured to receive contextual obstacle tracking data associated with ground-based obstacles, air traffic obstacles, or atmospheric-related obstacles, along or proximate to the flight path.

Receiving obstacle tracking data on ground-based obstacles, such as ground obstacle 210 shown in FIG. 2F, include receiving obstacle tracking data on terrain underlying or proximate to the first flight path 202, objects extending above-ground, population centers underlying the flight path, population density underlying or proximate to the flight path, geographic features underlying or proximate to the flight path, or airspaces along or proximate to the flight path. Receiving obstacle tracking data on atmospheric-related obstacles includes the collision avoidance system being configured to receive obstacle tracking data including weather or atmospheric conditions along or proximate to the flight path. Receiving obstacle tracking data associated with air traffic obstacles includes the collision avoidance system being configured to receive obstacle tracking data including any airborne objects within or predicted to enter the flight path or disposed proximate to the flight path.

In some implementations, the conflict monitoring and detection block 302 of the collision avoidance system 300 is configured to receive the obstacle tracking data from one or more data stores, such as location information datastore 310, in communication with the aircraft 204 or from one or more sensors, such as sensors 322, associated with or in communication with the aircraft. The data store includes data on potential static obstacles such as terrain obstacles (e.g., mountains, hills, or structures), ground obstacles (e.g., trees or buildings), and other potential and contextual obstacles that are not moving such as population centers and restricted areas (e.g., no-fly-zones, airports, restricted air space, etc.). The sensors include radar sensors, video cameras, motion detectors, or any other suitable sensor that detects moving or stationary obstacles. The sensors also include weather radar to collect weather data. Alternatively, weather data is received from ground station 326 or any other suitable information source. Data collected by the one or more sensors is received by the conflict monitoring and detection block at flying obstacle tracking block 304, ground obstacle tracking block 306, and weather obstacle tracking block 308, and monitored by the conflict monitoring and detection block. As described herein, in some example implementations, the one or more sensors are located onboard the aircraft 204. In some other implementations, some or all of the sensors are onboard other vehicles, on the ground, or onboard a satellite.

At the conflict monitoring and detection block 302, the collision avoidance system 300 is configured to determine, based on the obstacle tracking data as received, a predicted miss distance between the aircraft 204 and each of the one or more potential obstacles along the flight path, such as first flight path 202 in FIG. 2F.

Once the predicted miss distance is determined at the conflict monitoring and detection block 302, the collision avoidance system 300 is configured to determine, at the conflict resolutions generator 312, a plurality of alternate flight path options, such as first detour 209A and second detour 209B illustrated in FIG. 2H, if the predicted miss distance is below the predetermined threshold. Each of the plurality of alternate flight path options include a corresponding alternate flight path that deviates from the flight path, such as first flight path 202. At the conflict resolution analysis and decision block 314, the collision avoidance system is configured to assign at least two of the alternate flight path options a corresponding safety parameter value, the safety parameter value based on at least the predicted miss distance between the aircraft and at least one of the one or more potential obstacles. In some implementations, safety parameter values are assigned such that an alternate flight path with a lower predicted miss distance is assigned a higher safety parameter value than an alternate flight path with a higher predicted miss distance. That is, the alternate flight path with the lowest predicted miss distance will have the highest safety parameter assigned to it and the alternate flight path with the highest predicted miss distance will have the lowest safety parameter assigned to it. In some implementations, each of the alternate flight path options is assigned a corresponding safety parameter value.

In some implementations, the alternative flight path is further assigned the safety parameter based on the predicted miss distance of the alternate flight path being greater than the predetermined threshold, but also minimizing path deviation. For example an alternate flight path that goes beyond a predetermined deviation threshold will start having a higher and higher safety parameter because the alternate flight path becomes less useful when it deviates too far from the original flight path. Example predetermined deviation thresholds include 1000 feet, 2000 feet, one mile, or five miles, laterally.

At the conflict resolution analysis and decision block 314, the collision avoidance system 300 is configured to select an alternate flight path, such as first detour 209A or second detour 209B in FIG. 2H, from among the plurality of alternate flight path options. In some implementations, the selected alternate flight path is selected based at least on the selected alternate flight path having a lowest safety parameter value, the selected alternate flight path for the aircraft 204 avoiding the one or more potential obstacles, such as ground obstacle 210 in FIG. 2H, and at least one of the one or more contextual obstacles, such as contextual obstacle 211, proximate to the first flight path 202.

In some implementations, the collision avoidance system 300 is further configured to automatically transmit, or OUTPUT, the selected alternate flight path to a pilot or guidance system, such as guidance system 324 illustrated in FIG. 3B, of the aircraft 204. In some implementations, the pilot will observe the alternate flight path (e.g., on a display) and maneuver the aircraft to fly along the alternate flight path. The pilot is located in the aircraft itself or is a remote pilot controlling the aircraft from afar. Alternatively, the collision avoidance system is further configured to automatically maneuver the aircraft with the guidance system to follow the selected alternate flight path.

In some implementations, the safety parameter value assigned to an alternate flight path, such as first detour 209A illustrated in FIG. 2H, is further based on a hierarchical list of safety priorities. These safety priorities include avoiding the collision, avoiding injury to passengers onboard the aircraft, avoiding injury to passengers on aircraft nearby, not disturbing population centers, and avoiding property damage. At the conflict resolution analysis and decision block 314, the collision avoidance system 300 is further configured to assign each of the alternate flight path options a lower safety parameter value for the alternate flight path option achieving a greater number of safety priorities. For example, if first detour and second detour 209B both have similar probabilities of collision, but first detour avoids a population center and second detour does not, the first detour will be assigned the lower safety parameter value because it achieves a greater number of safety priorities. In some implementations, the collision avoidance system is configured to select the alternate flight path option that achieves the greatest number of safety priorities.

In some implementations, the collision avoidance system 300 is further configured to determine a succession of one or more additional alternate flight paths based on the obstacle tracking data as received or additional obstacle tracking data, including additional contextual obstacle tracking data, that is received after the alternate flight path is determined, and the collision avoidance system is further configured to automatically maneuver the aircraft 204 with the guidance system 324 to follow the succession of one or more additional alternate flight paths. For example, consider the fifth flight scenario 200E illustrated in FIG. 2E. After the aircraft 204 has moved along the detour 209, an unknown object is detected by the sensors on the aircraft and there is a probability that the aircraft will collide with the unknown object in the detour path, if the aircraft continues along the detour. While on the detour, the collision avoidance system is configured to determine a succession of one or more additional alternate flight paths (e.g., a detour of the detour 209) based on the obstacle tracking data as received. Then, the collision avoidance system is further configured to automatically maneuver the aircraft with the guidance system to follow the succession of one or more additional alternate flight paths.

In some implementations, the collision avoidance system 300 is further configured to determine, based on the obstacle tracking data as received, a predicted miss distance between the aircraft 204 and each of the one or more contextual obstacles, such as contextual obstacle 211 shown in FIG. 2F proximate to the flight path. In such cases, the safety parameter value is further based on the predicted miss distance between the aircraft and at least one of the one or more contextual obstacles proximate to the flight path. The collision avoidance system is further configured to determine a trajectory of relative motion between the aircraft and each of the one or more potential obstacles, such as flying obstacle 206 shown in FIG. 2F, and a trajectory of the aircraft in relation to the one or more contextual obstacles.

As described herein, the collision avoidance system 300 is configured to determine a probability that the aircraft 204 will collide with one or more potential obstacles and one or more contextual obstacles. In some implementations, the collision avoidance system is configured to determine the alternate flight path in response to the predicted miss distance between the aircraft and at least one of the one or more potential obstacles being equal to or less than a predetermined threshold. For example, if the conflict monitoring and detection block 302 determines that the predicted miss distance between the aircraft and the one or more potential obstacles is below the example and regulatory acceptable minimum distances described herein, the collision avoidance system is configured to determine the alternate flight path to avoid the one or more potential obstacles and the guidance system is configured to automatically maneuver the aircraft along the alternate flight path to avoid the collision.

Additionally, the collision avoidance system 300 is configured to determine the plurality of alternate flight path options in response to the predicted miss distance between the aircraft and at least one of the one or more contextual obstacles being equal to or less than a predetermined threshold. For example, if the conflict monitoring and detection block 302 determines that the predicted miss distance is less than the example and regulatory acceptable minimum distances described herein, the collision avoidance system is configured to determine the alternate flight path to avoid both the one or more potential obstacles and the one or more contextual obstacles and the guidance system is configured to automatically maneuver the aircraft along the alternate flight path to avoid the collision.

The seventh flight scenario 200G illustrates such an alternate flight path. If the aircraft 204 were to continue on the first flight path 202, the collision avoidance system would likely predict that the miss distance between the aircraft and the ground obstacle 210 would be close to, if not equal to, zero. The collision avoidance system will determine an alternate flight path going off to the right of the first flight path and detect the contextual obstacle 211. If the predicted miss distance is below the predetermined threshold, the alternate flight path, e.g., detour 209 shown, will need to go out further to the right of the contextual obstacle to avoid the collision. That is, the collision avoidance system is configured to determine alternate flight paths that have a predicted miss distance between the aircraft and the one or more potential obstacles (e.g., ground obstacle 210 or flying obstacle 206) of more than a predetermined threshold (e.g., the example and regulatory acceptable minimum distances described herein) and a predicted miss distance between the aircraft and one or more contextual obstacles (e.g., contextual obstacle 211) of more than the predetermined threshold (e.g., the example and regulatory acceptable minimum distances described herein).

It should be noted that the one or more contextual obstacles, do not have to be static. For example, the one or more contextual obstacles include one or more flying contextual obstacles that are flying parallel to the first flight path 202, but are far enough away from the first flight path such that it would not collide with the aircraft 204 if it remained along the first flight path.

Figure 4:
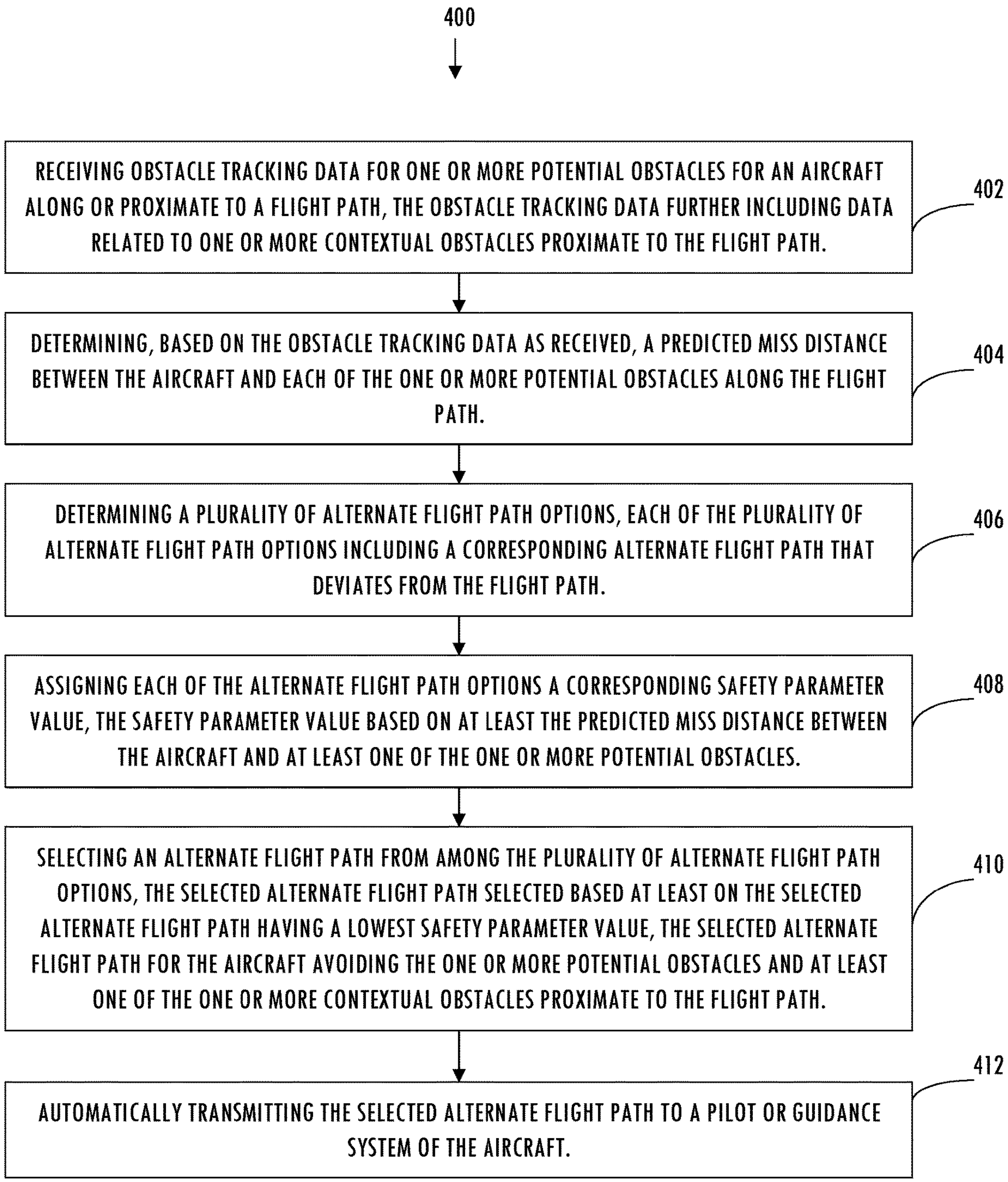
FIG. 4 illustrates a flow chart detailing steps of an example method, according to some embodiments of the present disclosure.

FIG. 4 illustrates a flow chart of an example method 400 for collision avoidance for an aircraft traversing a flight path the method using one or more processors in communication with a memory having executable instructions stored therein. As shown at block 402, the method includes receiving obstacle tracking data for one or more potential obstacles for the aircraft along or proximate to the flight path, the obstacle tracking data further including data related to one or more contextual obstacles proximate to the flight path. As shown at block 404, the method further includes determining, based on the obstacle tracking data as received, a predicted miss distance between the aircraft and each of the one or more potential obstacles along the flight path.

As shown at block 406, the method 400 further includes determining a plurality of alternate flight path options, each of the plurality of alternate flight path options including a corresponding alternate flight path that deviates from the flight path. As shown at block 408, the method further includes assigning at least two of the alternate flight path options a corresponding safety parameter value, the safety parameter value based on at least the predicted miss distance between the aircraft and at least one of the one or more potential obstacles.

As shown at block 410, the method 400 further includes selecting an alternate flight path from among the plurality of alternate flight path options, the selected alternate flight path selected based at least on the selected alternate flight path having a lowest safety parameter value, the selected alternate flight path for the aircraft avoiding the one or more potential obstacles and at least one of the one or more contextual obstacles proximate to the flight path. As shown at block 412, the method further includes automatically transmitting the selected alternate flight path to a pilot or guidance system of the aircraft.

According to example implementations of the present disclosure, the collision avoidance system 300 is implemented by various means. Means for implementing the collision avoidance system includes hardware, alone or under direction of one or more computer programs from a computer-readable storage medium. In some examples, one or more apparatuses are configured to function as or otherwise implement the collision avoidance system shown and described herein. In examples involving more than one collision avoidance systems, the respective collision avoidance systems are connected to or otherwise in communication with one another in a number of different manners, such as directly or indirectly via a wired or wireless network or the like.

Figure 5:
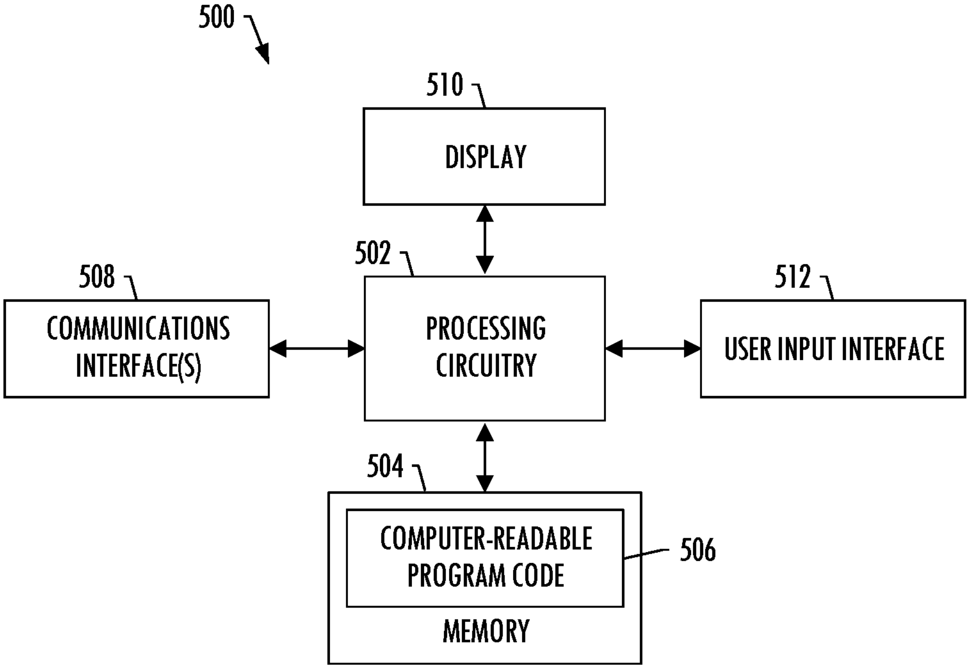
FIG. 5 illustrates an example apparatus according to some embodiments of the present disclosure.

FIG. 5 illustrates an apparatus 500 capable of implementing the collision avoidance system 300 according to some example implementations of the present disclosure that is collocated. The apparatus 500 is an example device that is used to implement the methods and functions described above with respect to the collision avoidance system. The apparatus is in communication with the sensors 322, the guidance system 324, and the ground station 326. Generally, an apparatus of exemplary implementations of the present disclosure comprises, includes, or is embodied in one or more fixed or portable electronic devices. Examples of suitable electronic devices include a microcontroller, controller, smartphone, tablet computer, laptop computer, desktop computer, workstation computer, server computer or the like. The apparatus includes one or more of each of a number of components such as, for example, processing circuitry

502 (e.g., processor unit or computer processor) connected to a memory 504 (e.g., storage device).

The processing circuitry 502 is composed of one or more processors alone or in combination with one or more memories. The processing circuitry is generally any piece of computer hardware that is capable of processing information such as, for example, data, computer programs and/or other suitable electronic information. The processing circuitry is composed of a collection of electronic circuits some of which is packaged as an integrated circuit or multiple interconnected integrated circuits (an integrated circuit at times more commonly referred to as a "chip"). The processing circuitry is configured to execute computer programs, which are stored onboard the processing circuitry or otherwise stored in the memory 504 (of the same or another apparatus).

The processing circuitry 502 includes a number of processors, a multi-core processor or some other type of processor, depending on the particular implementation. Further, the processing circuitry is implemented using a number of heterogeneous processor systems in which a main processor is present with one or more secondary processors on a single chip. As another illustrative example, the processing circuitry is a symmetric multi-processor system containing multiple processors of the same type. In yet another example, the processing circuitry is embodied as or otherwise include one or more ASICs, FPGAs or the like. Thus, although the processing circuitry is capable of executing a computer program to perform one or more functions, the processing circuitry of various examples is capable of performing one or more functions without the aid of a computer program. In either instance, the processing circuitry is appropriately programmed to perform functions or operations according to example implementations of the present disclosure.

The memory 504 is generally any piece of computer hardware that is capable of storing information such as, for example, data, computer programs (e.g., computer-readable program code 506) and/or other suitable information either on a temporary basis and/or a permanent basis. The memory includes volatile and/or non-volatile memory, and is fixed or removable. Examples of suitable memory include random access memory (RAM), read-only memory (ROM), a hard drive, a flash memory, a thumb drive, a removable computer diskette, an optical disk, a magnetic tape or some combination of the above. Optical disks include compact disk-read only memory (CD-ROM), compact disk-read/write (CD-R/W), DVD or the like. In various instances, the memory is referred to as a computer-readable storage medium. The computer-readable storage medium is a non-transitory device capable of storing information, and is distinguishable from computer-readable transmission media such as electronic transitory signals capable of carrying information from one location to another. Computer-readable medium as described herein generally refer to a computer-readable storage medium or computer-readable transmission medium.

In addition to the memory 504, the processing circuitry 502 is also connected to one or more interfaces for displaying, transmitting and/or receiving information. The interfaces include a communications interface 508 (e.g., communications unit) and/or one or more user interfaces. The communications interface is configured to transmit and/or receive information, such as to and/or from other apparatus (es), network(s) or the like. The communications interface is configured to transmit and/or receive information by physical (wired) and/or wireless communications links. Examples of suitable communication interfaces include a network interface controller (NIC), wireless NIC (WNIC) or the like.

The user interfaces include a display 510 and/or one or more user input interfaces 512 (e.g., input/output unit). The display is configured to present or otherwise display information to a user, suitable examples of which include a liquid crystal display (LCD), light-emitting diode display (LED), plasma display panel (PDP) or the like. The user input interfaces are wired or wireless, and are configured to receive information from a user into the apparatus, such as for processing, storage and/or display. Suitable examples of user input interfaces include a microphone, image or video capture device, keyboard or keypad, joystick, touch-sensitive surface (separate from or integrated into a touchscreen), biometric sensor or the like. The user interfaces further include one or more interfaces for communicating with peripherals such as printers, scanners or the like.

As indicated above, program code instructions are stored in memory and executed by processing circuitry that is thereby programmed, to implement functions of the systems, subsystems, tools and their respective elements described herein. As will be appreciated, any suitable program code instructions are loaded onto a computer or other programmable apparatus from a computer-readable storage medium to produce a particular machine, such that the particular machine becomes a means for implementing the functions specified herein. These program code instructions are also stored in a computer-readable storage medium that direct a computer, a processing circuitry or other programmable apparatus to function in a particular manner to thereby generate a particular machine or particular article of manufacture. The instructions stored in the computer-readable storage medium produce an article of manufacture, where the article of manufacture becomes a means for implementing functions described herein. The program code instructions are retrieved from a computer-readable storage medium and loaded into a computer, processing circuitry or other programmable apparatus to configure the computer, processing circuitry or other programmable apparatus to execute operations to be performed on or by the computer, processing circuitry or other programmable apparatus.

Retrieval, loading and execution of the program code instructions are performed sequentially such that one instruction is retrieved, loaded and executed at a time. In some example implementations, retrieval, loading and/or execution are performed in parallel such that multiple instructions are retrieved, loaded, and/or executed together. Execution of the program code instructions produce a computer-implemented process such that the instructions executed by the computer, processing circuitry or other programmable apparatus provide operations for implementing functions described herein.

Execution of instructions by a processing circuitry, or storage of instructions in a computer-readable storage medium, supports combinations of operations for performing the specified functions. In this manner, the apparatus 500 includes the processing circuitry 502 and the computer-readable storage medium or memory 504 coupled to the processing circuitry, where the processing circuitry is configured to execute computer-readable program code 506 stored in the memory. It will also be understood that one or more functions, and combinations of functions, are implemented by special purpose hardware-based computer systems and/or processing circuitry which perform the specified functions, or combinations of special purpose hardware and program code instructions.

Many modifications and other implementations of the inventions set forth herein will come to mind to one skilled in the art to which these disclosed implementations pertain having the benefit of the teachings presented in the foregoing descriptions and the associated drawings. Therefore, it is to be understood that implementations of the invention are not to be limited to the specific implementations disclosed and that modifications and other implementations are intended to be included within the scope of the invention. Moreover, although the foregoing descriptions and the associated drawings describe example implementations in the context of certain example combinations of elements and/or functions, it should be appreciated that different combinations of elements and/or functions are provided by alternative implementations without departing from the scope of the disclosure. In this regard, for example, different combinations of elements and/or functions than those explicitly described above are also contemplated within the scope of the disclosure. Although specific terms are employed herein, they are used in a generic and descriptive sense only and not for purposes of limitation.

It should be understood that although the terms first, second, etc. are be used herein to describe various steps or calculations, these steps or calculations should not be limited by these terms. These terms are only used to distinguish one operation or calculation from another. For example, a first calculation is termed a second calculation, and, similarly, a second step is termed a first step, without departing from the scope of this disclosure. As used herein, the term "and/or" and the "/" symbol includes any and all combinations of one or more of the associated listed items.

As used herein, the singular forms "a", "an" and "the" are intended to include the plural forms as well, unless the context clearly indicates otherwise. It will be further understood that the terms "comprises", "comprising", "includes", and/or "including", when used herein, specify the presence of stated features, integers, steps, operations, elements, and/or components, but do not preclude the presence or addition of one or more other features, integers, steps, operations, elements, components, and/or groups thereof. Therefore, the terminology used herein is for the purpose of describing particular implementations only and is not intended to be limiting.

That which is claimed:

1. A collision avoidance method for an aircraft traversing a flight path, the method using one or more processors in communication with a memory having executable instructions stored therein, the method comprising:

receiving obstacle tracking data for one or more potential obstacles for the aircraft along or proximate to the flight path, the obstacle tracking data further including data related to one or more contextual obstacles proximate to the flight path;

determining, based on the obstacle tracking data as received, a predicted miss distance between the aircraft and each of the one or more potential obstacles along the flight path;

determining a plurality of alternate flight path options, each of the plurality of alternate flight path options including a corresponding alternate flight path that deviates from the flight path, wherein each alternate flight path option, of the plurality of alternate flight path options, is equal to or greater than:

a threshold distance, and a threshold prediction confidence value;

assigning at least two of the plurality of alternate flight path options a corresponding safety parameter value, the corresponding safety parameter value based on at least the predicted miss distance between the aircraft and at least one of the one or more potential obstacles;

selecting an alternate flight path from among the plurality of alternate flight path options, the selected alternate flight path selected based at least on;

the selected alternate flight path having a lowest safety parameter value, the selected alternate flight path avoiding the one or more potential obstacles, and at least one of the one or more contextual obstacles proximate to the flight path;

automatically transmitting the selected alternate flight path to a guidance system of the aircraft; and automatically maneuvering the aircraft using the guidance system to follow the selected alternate flight path.

2. The method of claim 1, wherein the corresponding safety parameter value is further based on a hierarchical list of safety priorities, wherein assigning at least two of the alternate flight path options a corresponding safety parameter value includes assigning each of the alternate flight path options a lower safety parameter value for the alternate flight path option achieving a greater number of safety priorities than a number of safety priorities achieved by the flight path, and wherein selecting the alternate flight path from among the plurality of alternate flight path options includes selecting the alternate flight path option that achieves the greatest number of safety priorities.

3. The method of claim 1, wherein the method further comprises determining a succession of one or more additional alternate flight paths based on the obstacle tracking data as received or additional obstacle tracking data, including additional contextual obstacle tracking data, that is received after the alternate flight path is determined, and the method further comprises:

automatically maneuvering the aircraft with the guidance system to follow the succession of one or more additional alternate flight paths; or maneuvering the aircraft by a pilot to follow the succession of one or more additional alternate flight paths.

4. The method of claim 1, wherein the method further comprises determining, based on the obstacle tracking data as received, a predicted miss distance between the aircraft and each of the one or more contextual obstacles proximate to the flight path, wherein the corresponding safety parameter value is further based on the predicted miss distance between the aircraft and at least one of the one or more contextual obstacles proximate to the flight path, and wherein determining the predicted miss distance comprises determining a trajectory of relative motion between the aircraft and each of the one or more potential obstacles, and a trajectory of the aircraft in relation to the one or more contextual obstacles.

5. The method of claim 1, wherein determining the alternate flight path comprises determining the alternate flight path in response to the predicted miss distance between the aircraft and at least one of the one or more potential obstacles being equal to or less than a predetermined threshold; and wherein determining the plurality of alternate flight path options comprises determining the plurality of alternate flight path options in response to the predicted miss distance between the aircraft and at least one of the one or more contextual obstacles being equal to or less than a predetermined threshold.

6. The method of claim 1, wherein receiving obstacle tracking data for the one or more contextual obstacles comprises receiving obstacle tracking data associated with ground-based obstacles, air traffic obstacles, or atmospheric-related obstacles, along or proximate to the flight path.

7. The method of claim 6, wherein receiving obstacle tracking data associated with ground-based obstacles comprises receiving obstacle tracking data including data about terrain underlying or proximate to the flight path, objects extending above-ground, population centers underlying the flight path, population density underlying or proximate to the flight path, geographic features underlying or proximate to the flight path, or airspaces along or proximate to the flight path.

8. The method of claim 6, wherein receiving obstacle tracking data associated with atmospheric-related obstacles comprises receiving obstacle tracking data including data about weather or atmospheric conditions along or proximate to the flight path; and wherein receiving obstacle tracking data associated with air traffic obstacles comprises receiving obstacle tracking data including data about any airborne objects within or predicted to enter the flight path or disposed proximate to the flight path.

9. The method of claim 1, wherein receiving the obstacle tracking data comprises receiving the obstacle tracking data from one or more data stores in communication with the aircraft or from one or more sensors associated with or in communication with the aircraft.

10. The method of claim 1, wherein receiving obstacle tracking data comprises:

receiving obstacle tracking data including data about population centers underlying the flight path or population density underlying or proximate to the flight path.

11. A collision avoidance system for an aircraft traversing a flight path, the collision avoidance system comprising:

a processor and a non-transitory computer readable medium comprising executable instructions that when executed by the processor, causes the collision avoidance system to be configured to:

receive obstacle tracking data for one or more potential obstacles for the aircraft along or proximate to the flight path, the obstacle tracking data further including data related to one or more contextual obstacles proximate to the flight path;

determine, based on the obstacle tracking data as received, a predicted miss distance between the aircraft and each of the one or more potential obstacles along the flight path;

determine a plurality of alternate flight path options, each of the plurality of alternate flight path options including a corresponding alternate flight path that deviates from the flight path, wherein each of the alternate flight path options are equal to or greater than:

a threshold distance, and a threshold prediction confidence value;

assign at least two of the plurality of alternate flight path options a corresponding safety parameter value, the corresponding safety parameter value based on at least the predicted miss distance between the aircraft and at least one of the one or more potential obstacles;

select an alternate flight path from among the plurality of alternate flight path options, the selected alternate flight path selected based at least on:

the selected alternate flight path having a lowest safety parameter value, the selected alternate flight path avoiding the one or more potential obstacles, and at least one of the one or more contextual obstacles proximate to the flight path;

automatically transmit the selected alternate flight path to a guidance system of the aircraft; and automatically maneuver the aircraft using the guidance system to follow the selected alternate flight path.

12. The collision avoidance system of claim 11, wherein the corresponding safety parameter value is further based on a hierarchical list of safety priorities, wherein the collision avoidance system being configured to assign at least two of the plurality of alternate flight path options a corresponding safety parameter value includes the collision avoidance system being configured to assign each of the plurality of alternate flight path options a lower safety parameter value for an alternate flight path option achieving a greater number of safety priorities than a number of safety priorities achieved by the flight path, and wherein the collision avoidance system being configured to select the alternate flight path from among the plurality of alternate flight path options includes the collision avoidance system being configured to select the alternate flight path option that achieves a greatest number of safety priorities.

13. The collision avoidance system of claim 11, wherein the collision avoidance system is further configured to determine a succession of one or more additional alternate flight paths based on the obstacle tracking data as received or additional obstacle tracking data, including additional contextual obstacle tracking data, that is received after the alternate flight path is determined, and the collision avoidance system is further configured to automatically maneuver the aircraft with the guidance system to follow the succession of the one or more additional alternate flight paths.

14. The collision avoidance system of claim 11, wherein the collision avoidance system is further configured to determine, based on the obstacle tracking data as received, a predicted miss distance between the aircraft and each of the one or more contextual obstacles proximate to the flight path, wherein the corresponding safety parameter value is further based on the predicted miss distance between the aircraft and at least one of the one or more contextual obstacles proximate to the flight path, and wherein the collision avoidance system being configured to determine the predicted miss distance comprises the collision avoidance system being configured to determine a trajectory of relative motion between the aircraft and each of the one or more potential obstacles, and a trajectory of the aircraft in relation to the one or more contextual obstacles.

15. The collision avoidance system of claim 11, wherein the collision avoidance system being configured to determine the alternate flight path comprises the collision avoidance system being configured to determine the alternate flight path in response to the predicted miss distance between the aircraft and at least one of the one or more potential obstacles being equal to or less than a predetermined threshold; and wherein the collision avoidance system being configured to determine the plurality of alternate flight path options comprises the collision avoidance system being configured to determine the plurality of alternate flight path options in response to the predicted miss distance between the aircraft and at least one of the one or more contextual obstacles being equal to or less than a predetermined threshold.

16. The collision avoidance system of claim 11, wherein the collision avoidance system being configured to receive obstacle tracking data for the one or more contextual obstacles comprises the collision avoidance system being configured to receive obstacle tracking data associated with ground-based obstacles, air traffic obstacles, or atmospheric-related obstacles, along or proximate to the flight path.

17. The collision avoidance system of claim 16, wherein the collision avoidance system being configured to receive obstacle tracking data associated with ground-based obstacles comprises the collision avoidance system being configured to receive obstacle tracking data including terrain underlying or proximate to the flight path, objects extending above-ground, population centers underlying the flight path, population density underlying or proximate to the flight path, geographic features underlying or proximate to the flight path, or airspaces along or proximate to the flight path.

18. The collision avoidance system of claim 16, wherein the collision avoidance system being configured to receive obstacle tracking data associated with atmospheric-related obstacles comprises the collision avoidance system being configured to receive obstacle tracking data including weather or atmospheric conditions along or proximate to the flight path; and wherein the collision avoidance system being configured to receive obstacle tracking data associated with air traffic obstacles comprises the collision avoidance system being configured to receive obstacle tracking data including any airborne objects within or predicted to enter the flight path or disposed proximate to the flight path.

19. The collision avoidance system of claim 11, wherein the collision avoidance system being configured to receive the obstacle tracking data comprises the collision avoidance system being configured to receive the obstacle tracking data from one or more data stores in communication with the aircraft or from one or more sensors associated with or in communication with the aircraft.

20. The collision avoidance system of claim 11, wherein receiving obstacle tracking data comprises restricted areas including one or more of:

no-fly zones,
airports, or
restricted air space.

* * * * *